United States Patent [19]

Hauser

[11] 4,348,832
[45] Sep. 14, 1982

[54] SINGLE FLOWER STEM CUTTER

[76] Inventor: Allan H. Hauser, 15295 Westover Rd., Elm Grove, Wis. 53122

[21] Appl. No.: 315,499

[22] Filed: Oct. 27, 1981

[51] Int. Cl.³ .............................................. A01G 1/00
[52] U.S. Cl. .................................... 47/1 R; 30/123.3;
47/6; 83/22; 83/169; 99/637
[58] Field of Search ................... 47/1, 1.5, 1.7, 4, 6,
47/7, DIG. 2, DIG. 3; 30/123.3; 83/22, 169;
99/635, 637, 516, 640

[56] References Cited

U.S. PATENT DOCUMENTS

| 351,879 | 11/1886 | Maynard | 47/6 |
| 773,743 | 11/1904 | Von Hoffmann | 47/1 |
| 2,747,330 | 5/1956 | Simpkins | 47/1 |
| 2,763,926 | 9/1956 | Pate | 30/241 |
| 3,911,577 | 10/1975 | Nickel | 30/241 |
| 4,014,132 | 3/1977 | Cook | 47/6 |
| 4,098,020 | 7/1978 | Cook | 47/6 |
| 4,138,940 | 2/1979 | Fujii | 99/640 |

FOREIGN PATENT DOCUMENTS

| 408781 | 4/1910 | France | 47/6 |
| 671852 | 5/1952 | United Kingdom | 47/6 |
| 673240 | 7/1979 | U.S.S.R. | 47/7 |

OTHER PUBLICATIONS

Laurie, A. "Studies of the Keeping Qualities of Cute Flowers" *Agricultural Newsletter* (DuPont), vol. 9, No. 2, Mar.-Apr. 1941, pp. 22-24.

*Primary Examiner*—James R. Feyrer
*Attorney, Agent, or Firm*—Andrus, Sceales, Starke & Sawall

[57] ABSTRACT

A flower stem cutter for an individual flower includes a liquid filled jar having a cover releasably attached. The liquid includes any antibacterial agent and feed. A flower stem guide is secured to a diametrical slot in the cover and projects inwardly into the liquid. The guide is triangular U-shaped unit defining a base wall in spaced relation to the opposite jar wall. The vertical edge of the guide sidewall projects inwardly. A guillotine cutting unit includes a cutting support blade secured to the lower inner end of the guide and a guillotine blade secured to a shaft journaled in the cover, with the guillotine blade abutting the edges of the U-shaped guide. The guillotine blade is resiliently supported on a shaft journaled in the cover for movement past the support blade to sever the stem under the protective liquid. The shaft is manually operated or connected to a small solenoid on the top of the cover. If solenoid operated, the stem may strike a lever in the jar at the appropriate location to energize the solenoid and sever the stem.

11 Claims, 6 Drawing Figures

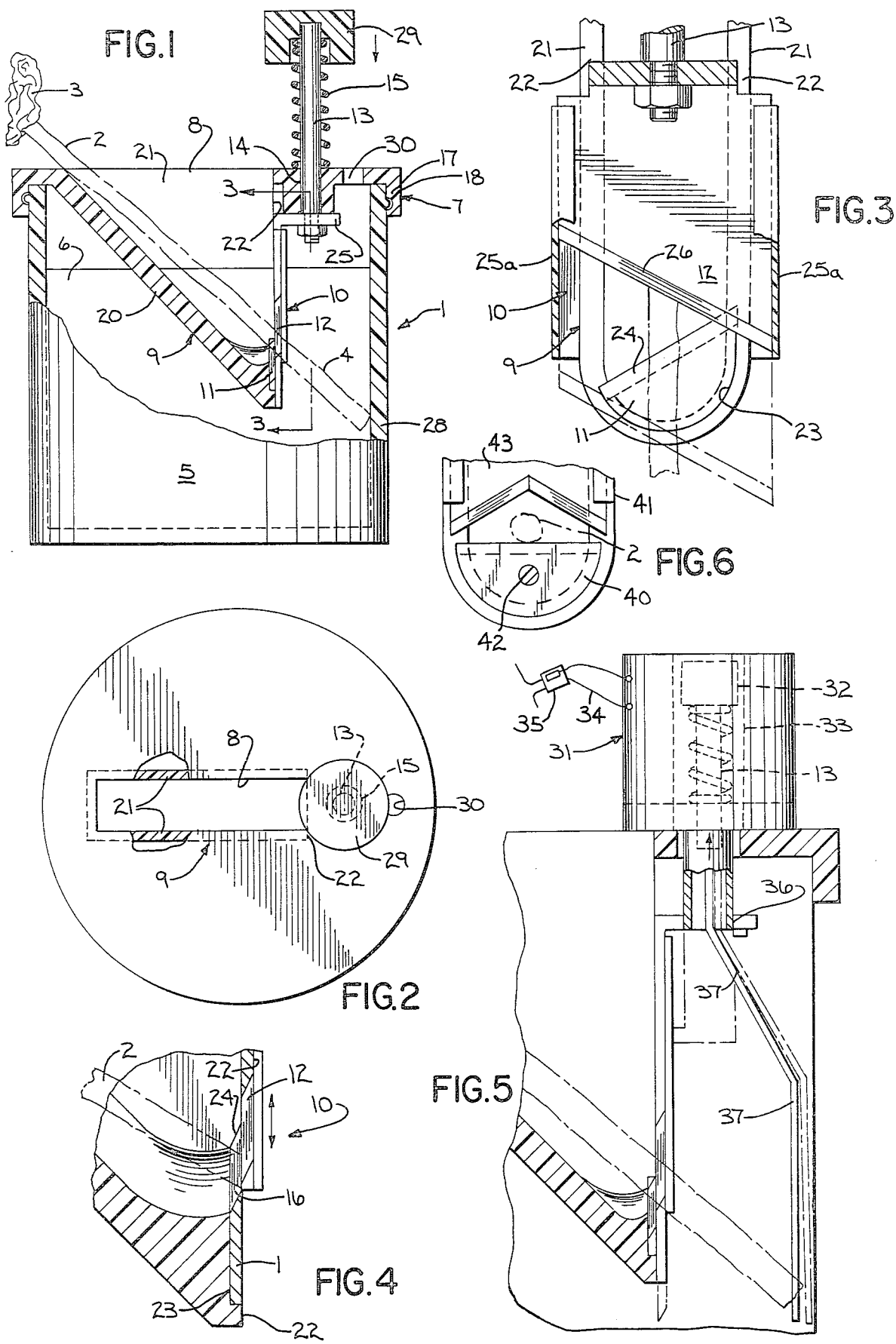

SINGLE FLOWER STEM CUTTER

BACKGROUND OF THE INVENTION

This invention relates to a small compact flower stem cutter particularly adapted for severing the end of the stem of a single fresh cut flower.

Cut flowers are widely used in homes, offices and other similar locations because of the great esthetic value of various cut flowers, such as roses, carnations and many others. The natural cut flowers are thus greatly valued and are often home grown as well as gorwn and marketed commercially. The commercial flowers are of course grown in nurseries, and then distributed directly or often through wholesalers who sell to various retail sales outlets. Following the period of cutting, the stems and particularly the ends, are maintained in a moist condition, and in a retail store are generally stored in a liquid with the stems covered by the liquid. Finally, it is recommended that a short length be cut from the stem by the final purchaser prior to its placing in the display container, such as a water filled vase. The cutting of the stem end is known to extend the life of the cut flower. Certain additives can of course also be provided in the water both during storage and display which will extend the life of the cut flower.

The gathered cut flowers in a nursery may have stems of various lengths. For convenience in storage, as well as transportation and distribution, and the like, the gathered flowers are normally cut to a more or less standard length. A relatively large machine has been suggested for use in a wholesale establishment for cutting the stems directly or cutting the stems in a water bath to protect the cut stems from the air and the like. After being cut, the flowers are stored, with the stems usually wrapped in wet paper or the like to maintain the protection of the cut stem from the air and to provide moisture to the flower.

Although the cutting of the stem contributes to the life of the flower, the home owner cuts a number of the flowers with a knife, scissors or like available instrument and then places them in the vase, which may be filled with water before or after the cutting. Although such procedure contributes to the life of a flower, the exposure of the cut stem to the air reduces the effectiveness of the life extending feeding. Further, many instruments used, such as the usual scissor, may tend to crush the end of the flower rather than producing a smooth severing of the end.

SUMMARY OF THE PRESENT INVENTION

The present invention is particularly directed to a small, compact and relatively inexpensive flower stem cutter which can be used in the home or the like for removing the appropriate end of the stem in an improved manner so as to maximize the effectiveness of the cutting of the end of the stem just prior to the placing in the vase. Generally in accordance with the present invention, a small, portable container is provided having a cover member. The container is filled with a suitable liquid such as water, with or without a food additive. A support is provided for a flower stem extending into the water and through a special guillotine-type cutting unit. The support in a particularly unique construction has a support blade of the guillotine-type cutting unit secured to the innermost end. The support blade defines a sharp support edge on which the inner end portion of the flower stem is supported. The innermost end of the flower stem projects beyond the support blade. A guillotine blade is movably mounted to move closely adjacent and past the support blade to sever the flower stem at a biased or angled cut. The support blade is specially located in the lower portion of the container to support the stem with the end to be cut beneath the level of the water or other liquid without the support blade and the guillotine blade. The stem is not properly and thoroughly severed.

In use, the guillotine blade is retracted and the flower stem is placed in position. The guillotine blade is then forced past the support blade to create a sharp, clean severing of the flower stem. The guillotine blade is then retracted, exposing the severed or fresh cut end of the flower stem to the water. The flower may then be removed from the container and preferably placed immediately into a water filled vase. However, it should be noted that the flower stem has been provided with a protective liquid coating as a result of the severing within the water which contributes and minimizes the effect of any momentary or short exposure to the air. One or more flowers may be appropriately cut while maximizing the effect of the cutting of the stems. After all of the flowers have been cut, the liquid used in the cutting container may be readily transferred to the vase as an additive to the water filled vase. The liquid may include an anti-bacterial agent and feed. The anti-bacterial agent will be transmitted by osmosis and add flower life.

In an optimum construction, the container is a small portable jar having a removable cover. The cover includes an elongated slot with a stem guide unit extending inwardly therefrom. The guide unit includes an inclined base wall projecting downwardly into the jar and side walls to guide the flower stem into the jar. The lower end of the wall is formed with a support blade which projects upwardly into the guide unit. The cutting support blade is spaced from the adjacent wall of the jar by a distance corresponding to the appropriate length of the flower stem to be removed, such as one inch. By inserting the stem fully, the stem is appropriately located on the cutting blade. The guillotine blade is secured to a shaft which is slidably mounted in the upper cover and resiliently urged to a retracted or raise position. The guillotine-blade is falt, plate like member secured to the inner end of the shaft and is preferably laterally offset. The flat guillotine blade is movable in a plane immediately adjacent to the outer plane of the support blade. The guillotine blade may be guided to move without rotation by the inner edges of the side walls of the guide member. The support blade is preferably constructed with the cutting inclined with respect to the horizontal edge of the guillotine blade is formed with an opposite incline to that of the support blade. The angled relationship of the relatively moving blades define a collapsing V-shaped opening which contributes to a clean severing of the flower stem.

Although the apparatus can be conveniently manually operated, a small electric operator such as the solenoid can be readily provided to operate the guillotine blade. In such a structure the supporting shaft may be formed as a hollow member with an automatic contact extended downwardly through the shaft, in spaced insulated relationship thereto. The inner end of the contact projects downwardly beyond the support blade and is angled outwardly toward the gauge wall. When the flower stem is inserted and the end approaches the final desired cutting position, the end engages and deflexes the contact causing it to move into operative engagement with a fixed contact. This completes the circuit to momentarily actuate the solenoid. The solenoid operates to automatically depress and retract the guillotine blade, with the desired smooth cutting of the flower stem.

The present invention thus particularly provides a small, compact flower stem cutter which is uniquely adapted to use by the end purchaser and user of cut flowers to provide an optimum long life of the flower on display.

DESCRIPTION OF THE DRAWING FIGURES

The drawing furnished herewith illustrates a preferred construction of the present invention in which the above advantages and features are clearly disclosed as well as others which will be readily understood from the following description.

In the drawing:

FIG. 1 is a side elevational view of an embodiment of the invention with a flower in place for cutting of the stem and with parts broken away and sectioned;

FIG. 2 is a top view of FIG. 1;

FIG. 3 is a fragmentary end view taken generally on line 3—3 of FIG. 1;

FIG. 4 is an enlarged vertical fragmentary section taken generally on line 3—3 of FIG. 3;

FIG. 5 is a view similar to FIG. 3 showing an alternate solenoid operated embodiment of the invention; and FIG. 6 is a fragmentary view similar to FIG. 3 showing an alternate guillotine blade system.

DESCRIPTION OF THE ILLUSTRATED EMBODIMENT

Referring to the drawing and particularly to FIGS. 1-3, a flower stem cutter 1, constructed in accordance with the teaching of the present invention, is shown with the stem 2 of a fresh cut flower 3 located and supported within the flower cutter for removing of the lower end 4 of the flower stem 2. The illustrated flower cutter 1 generally includes a small jar-like container 5. The container 5 is filled with water or other suitable liquid 6 to a substantial depth shown as approximately ⅔ of the depth. The jar 5 is closed by a cover 7 which is releasably attached to the jar. The cover 7 includes a top elongated opening or slot 8 with a flower guide member 9 projecting inwardly from the opening to locate the flower stem 2 extending angularly across the jar with the lower end of the stem submerged substantially within the water 6. A guillotine cutting unit 10 is secured within the jar 5. The cutting unit 10 includes a cutting support blade 11 secured to the innermost end of the stem guide unit 9. A guillotine blade 12 is supported by a shaft 13 for movement past the support blade 11. In the illustrated embodiment of the invention, the support shaft 13 is journaled in an opening 14 in the cover 7 with an outer spring 15 urging the shaft 13 and the attached blade 12 to a raised position abutting the underside of the cover. The plunger or shaft 13 is rapidly depressed against the small force of the spring 5 to move the guillotine blade 12 past the support blade 11 to effect a clean, smooth severing of the lower end 4 of the flower stem under the water bath 6. The angled orientation of the flower stem 2 results in a biased or angled cut to increase the area of the stem end 16 thereby increasing the exposure to the liquid or water in the vase or the like during the display life of the flower, as shown in FIG. 4.

Thus, as shown in FIG. 4, the flower stem is severed such that cut or exposed end 16 is under the water 6 and when removed the flower is removed will carry a water film. The sever exposed end 16 thus in essence is continuously protected against contact directly with the air.

More particularly in the illustrated embodiment of the invention, the container may be a small glass jar such as used in canning and retailing of various small amounts of food products. For example, the jar may have a diameter of four or five inches and a corresponding depth. The upper end of the jar 5 of course is formed with a suitable large thread 17. The cover 7 is generally a conventional cup-shaped jar type cover having an outer depending rim 18 within an internal thread for threading onto the jar to secure the cover to the jar. It is not necessary to have a water-tight seal, but it should be firmly attached.

The stem opening or slot 8 extends diametrically across the cover. The U-shaped guide member 9 is generally triangular shaped and has a generally U-shaped cross-section. The guide member 9 is secured to the peripheral edges of the cover slot 8 and defines a bottom inclined wall 20 which extends inwardly and laterally across the jar from adjacent the periphery of the cover 7. Side walls 21 are formed between the inclined wall 20 and the slot 8 to confine the flower stem 2 as it moves into the jar. The inner edges 22 of the U-shaped side walls 21 are a flat walls which extend vertically into the jar.

The support blade 11 of the guillotine cutting unit 10 is secured to the lower innermost end of the guide unit 9. The support blade 11 is a small, flat plate-like member, and is preferably secured within a recess 23 in the lower end of the base 20 and side walls 21, such that the outer face of the blade 11 is coplanar with the edges 22 of the side walls 21. The support blade 11 closes the lower end of the U-shaped guide unit with the cutting edge 24 raised slightly. The guide unit 9 may have the base shaped to fill the base, behind the blade 11 and thus guide the stem end 4 over the blade. The support blade 11 is further constructed and arranged to define the sharp cutting edge 24 extending at an angle across the guide unit.

The guillotine blade 12 is also a small plate-like member having an upper angle support plate or tab 25 which extends at 90 degrees from the top edge of the blade. The support shaft 13 is fixed to the tab 25 and projects upwardly through the bearing opening 14 in the cover 7. The bearing opening in the cover 7 is located to locate the guillotine blade 12 in sliding abutting engagement with the side edges 22 of the U-shaped guide member 9. As shown most clearly in FIG. 4, the guillotine blade 12 is formed with a width slightly greater than that of the U-shaped member 9. A angled guide 25a may be provided on each edge 22 of the guide member 9 to slidably support blade 12 abutting the edge 22. This arrangement guides the guillotine blade 12 past the support cutting blade 11 in essentially engagement with the outer face of the support blade. Further, the lower cutting edge 26 of the guillotine blade 12 is formed with an incline or angle to the horizontal extending opposite to that of the support blade 11. The support blade 11 and the guillotine blade 12 thus define a V-shaped opening as shown in FIG. 3, through which the flower stem 2 extends. Depressing of the shaft 13 causes the guillotine blade 12 to thus move downwardly trapping the lower flower stem 4 between the blades and then passing through stem 4, with the flower stem forced over and through the support blade 11. This results in a severing of the flower stem with a smooth, clean cut and exposing of the severed end to the liquid 6. The angled orientation of the flower stem 2 results in a bias cut of the end as shown at 27 in FIG. 4 to expose a significant area of the flower stem to the protective liquid bath 6.

The bath 6 may be any suitable liquid including water to which a suitable additive, such as that readily available from various commercial sources, has been added. A particularly suitable additive is sold by Floral Life which sells a flower additive under the trademark "Floral Life."

As shown most clearly in FIGS. 1 and 3, the U-shaped guide member 9 is located extending substantially across the jet 5. In fact, the inner vertical edge 22 is accurately located to particularly locate the support blade 11 in a desired accurate spacement with respect to the outer wall 28 of the jar 5. It is suggested that approximately one inch be cut from the stem 2 of the flower 3. Additives in the water may make it difficult to clearly see the end of the stem, and in any event it is an inconvenience if one must check the extension. By proper locating of the blade, the user merely inserts the stem 2 fully into the jar 5 along the guide member to the opening until the inner end abuts the jar wall 28. The user can then be assured that the stem 2 has been properly located for cutting.

The shaft 13 in the illustrated embodiment of the invention projects outwardly through the bearing opening 14 with a small disc handle 29 secured to the outermost end of the shaft 13. A suitable small coil spring 15 encircles the shaft between the cover 7 and the handle 29 and resiliently urges the shaft outwardly until the blade 12 cap abuts the underside of the cover 7. The blade 12, as shown in FIG. 4, in the raised position overlaps and abuts the upper portion of the support blade 11. The lower blade 11 as noted is secured with a recessed portion of the guide member 9. However, it is subjected to substantial forces including bending forces. The overlap of the blades serves to support the blade in the proper positions and tends to prevent loosening thereof.

The cutting support and guillotine blades are preferably formed of a stainless steel or other suitable material which will not rust and deteriorate under the water environment. Although stainless steel blades are preferred any other suitable material including plastics or the like can of course be employed.

The cover, as illustrated, may be provided with a small opening 30 for convenient pouring of the liquid 6 from the cutting jar 5 into the vase, not shown.

Although the guide unit 9 is shown as a solid wall member it can of course be readily constructed as an open frame work or as a separate structure affixed to the jar or the cover. The enclosed structure as illustrated is preferred to accurately guide the stem into the jar with the stem properly located in overlying relation to te support blade. The cover 7 with the several plastic supports may be readily formed as an integral molded member of plastic or the like. The unit can of course be formed of any other desired material and can be formed with a multiple part member with suitable interconnection of the several parts to form the cover structure. Further, if a separate container is specially formed it of course can be provided and constructed with the flower stem and support blade structure as well as the pouring opening. The advantage of the structure shown in the illustrated embodiment is convenient adaptation to available commercial flower jars presently in the home or otherwise readily available at a very low cost to the user.

An alternative small, portable powered unit is illustrated in FIG. 5, in which the structure essentially corresponds to that of the embodiments of FIGS. 1-4. However, in place of the manually operated plunger, a solenoid or unit 31 is connected to operate the guillotine blade 12. Corresponding elements in the embodiments of FIG. 5 and FIGS. 1-4 are correspondingly numbered for simplicity and clarity of explanation.

In the embodiment of FIG. 5 the solenoid unit 31 is mounted to the upper cover 7 and coupled to the outer end of the shaft 13. The solenoid unit 31 may be any desired or conventional structure having a movable core 32 within a fixed winding 33. The winding 33 is secured to the cover 7. The core 32 is secured to the outer end of the shaft 13. The core and shaft are biased outwardly by the spring 15 encircling the shaft 13. The winding 33 is of course provided with a power input lead 34 which may be provided with a main on-off switch 35. When the switch 35 is closed, the winding is adapted to be energized to move the core 32 downwardly against the bias of the spring 13. This may result in a corresponding severing movement of the guillotine blade 12 corresponding to the manual operation of the first embodiment.

In the illustrated embodiment of FIG. 5, the switch 35 adapts the unit 31 for energization. A stem position sensor means is provided for actuating of the solenoid unit 31, as follows. The support shaft 13 is shown as a hollow conductive shaft. The attachment tab 25 is provided with an opening 36 aligned with the shaft and tab opening. An electrode or contact wire 37, such as a rigid rod, is secured within the shaft opening and extends downwardly through the tab opening 36. The lower projecting end of wire 37 is bent outwardly toward the stop wall 28, as at 37, and is formed as a plate-like member extending laterally across the path of the inner portion 4 of flower stem 2. The movement of the flower stem 4 into the cutting position engages the outer plate end 37 of the wire 36 just prior to the stem projecting the desired distance beyond the blade 11. The wire 36 is deflected into engagement with the outer shaft 13. This completes the circuit from lead 34 to the solenoid winding 33 resulting in energization of the solenoid unit 31. The electromagnetic field established by the winding 33 causes the core 32 to rapidly move downwardly forcing the shaft 13 and interconnected guillotine blade 12 downwardly to sever the lower end 4 of the flower stem 2. The stem portion 4 drops off and the wire 37 resets. Thus, the solenoid unit 31 operates with a pulse type operation with automatic reset of the blade 12.

FIG. 6 illustrates an alternate guillotine blade system in which a lower fixed blade 40 is secured to a flower stem guide unit 41 as by a screw 42 to firmly support the blade defining the cutting action. A movable guillotine blade 43 is similar as in the first embodiment but the cutting edge 44 is V-shaped or the like to define a pair of inclined cutting edges, as shown. This provides a three point cutting action with a positive action. The blade 43 is moved downwardly and stopped before the apex reaches the holding screw.

The present invention thus provides a simple reliable and relatively inexpensive flower stem cutter for cutting of individual, or a couple of flower stems, while maintaining of the flower stem within a bath of water or other protective liquid. The cut stem can be removed and placed in a water filled vase immediately or very shortly thereafter. The invention has been shown in the preferred construction but obviously many variations can be provided within the concept of providing the guillotine cutting blade structure for severing of the flower stem.

Various modes in carrying out the invention are contemplated as being within the scope of the following claims, particularly pointing out and distinctly claiming the subject matter which is regarded as the invention.

I claim:

1. A flower stem cutter, comprising a hand portable container for confining a bath of liquid sufficient to cover the lower end of a flower stem beyond a severing location, a support blade located within said container below the water level, means for locating a flower stem resting on said support blade and extending laterally and upwardly of the support blade, a guillotine blade in the plane immediately adjacent the plane of said support blade, and means for relatively moving of said blades to move pass each other blade and thereby sever a flower stem supported therebetween.

2. A flower stem cutter for using in the home, office or the like for cutting of individual flower stems, from cut flowers, comprising a cup-shaped jar adapted to be manually transported, said jar having a threaded top wall, a cover releasably secured to the top of the jar, said cover including a stem locating slot extending across the cover and a stem locating guide unit secured to said slot and projecting downwardly substantially into said jar, a cutting support blade secured to inner end of said guide unit, said support blade being located in a substantially vertical plane and including an upper cutting edge, a guillotine blade havig a bottom cutting edge, movable means slidably mounted in said cover for vertical movement into said jar, means connecting said movable means to said guillotine blade and locating said guillotine blade in the plane immediately continuous and engaging the outer face of said support blade.

3. A flower stem cutter for severing of the outer end of an individual flower comprising a manually portable container having a width on the order of five inches and a depth at least of approximately five inches, a cover releasably attached to said jar, said cover including a diametrical slot through which a flower stem is insertable into said jar, said slot extending at least across one half the diameter of the cover, a flower stem guide unit secured to the slot and projecting inwardly into said jar, said flower stem support being a generally U-shaped member having a width generally slightly larger than a flower stem, said U-shaped member having a triangular configuration defining a base wall extending inwardly and laterally of the jar from the edge of the jar and terminating at the inner end in spaced relation to the opposite wall to the wall of the jar, said U-shaped member having a substantially vertical edge projecting inwardly of the jar to the lowermost end thereof, a cutting support blade secured to the lower inner end of said U-shaped support, a guillotine blade located within said jar, a movable support secured to said guillotine blade and journaled in said cover, said movable support locating said guillotine blade abutting the edge of the U-shaped support and thereby locating said guillotine blade in a plane immediately adjacent and parallel to the plane of the cutting support blade, means resiliently biasing said guillotine blade outwardly of the cutting support blade, and means for moving of said support inwardly for forcing of said guillotine blade past the cutting support blade for severing of a flower stem located in said U-shaped member and on said support blade to thereby establish a bias cut of the flower stem under a protective liquid.

4. The flower stem cutter of claim 3 wherein said cutting support blade being located with an upper cutting edge extends across the member with the cutting edge located angularly in a vertical plane, said guillotine blade includes a bottom cutting edge angularly oriented in the plane of said blade, the angle orientation being opposite to the angular orientation of said cutting support blade whereby said blades define a collapsing V-shaped opening within which said flower stem is located during the cutting motion.

5. The apparatus of claim 3 wherein said U-shape member includes continuous side walls and an inclined base wall, the lowermost inner edge of said side and bottom walls including a notch within which said cutting support blade is located with the outer face of the cutting support blade in the plane of said guide edges.

6. The apparatus of claim 3 wherein said guillotine blade support includes a tubular shaft journaled in said cover, said guillotine blade includes an offset tab secured to the inner end of said shaft and includes an opening aligned with an opening in said shaft, a solenoid secured to the outer end of the shaft and operable to move said shaft, contact means secured to said shaft and including a deflectable contact projecting inwardly from the lower end of the shaft and tab and laterally toward the wall of the container of jar, said contact being located in the innermost position of the flower stem and engageable by the innermost end of the flower stem, said flower stem moving to an innermost position deflecting said contact to affect a switch closure, and means connecting said switch and circuit to said solenoid to provide a momentary energization of the solenoid for the movement for creating movement of the guillotine blade past the support blade to thereby sever the flower stem.

7. The apparatus of claim 3 wherein said guillotine blade is slidably journaled in said cover, said support member including an outer manually operated handle for reciprocation for forcing of the support member and blade into said jar for moving of said guillotine blade past the cutting support blade.

8. The apparatus of claim 3 wherein said cover is formed as a molded plastic cover and having said guide unit is integrally formed therewith.

9. The apparatus of claim 3 wherein said jar includes a liquid containing an antibacterial agent.

10. The apparatus of claim 3 wherein said jar includes a liquid containing an antibacterial agent and a flower feeding material.

11. The apparatus of claim 3 wherein said fixed blade has a horizontally located cutting edge, screw means connecting said blade to said V-shaped member, and said guillotine blade has a substantially V-shaped exiting edge.

* * * * *

UNITED STATES PATENT AND TRADEMARK OFFICE
CERTIFICATE OF CORRECTION

PATENT NO. : 4,348,832
DATED : September 14, 1982
INVENTOR(S) : Allan H. Hauser

It is certified that error appears in the above-identified patent and that said Letters Patent are hereby corrected as shown below:

| | | |
|---|---|---|
| Column 1, | Line 13, | At beginning of sentence cancel "gorwn" and substitute therefore --- grown ---; |
| Column 2, | Line 46, | After "is" cancel "falt," and substitute therefore --- flat, ---; |
| Column 3, | Line 4, | After "momentarily" cancel "actuage" and substitute therefore --- actuate ---; |
| Column 5, | Line 59, | After "to" cancel "te" and substitute therefore --- the ---; |
| Column 7, CLAIM 1, | Line 24, | After "move" cancel "pass" and substitute therefore --- past ---; |
| Column 7, CLAIM 2, | Line 37, | After "blade" cancel "havig" and substitute therefore --- having ---. |

Signed and Sealed this

Seventh Day of December 1982

[SEAL]

Attest:

GERALD J. MOSSINGHOFF

Attesting Officer

Commissioner of Patents and Trademarks